March 27, 1962  J. L. CASSELL  3,027,554
CONTACTLESS DIRECT CURRENT VIBRATING BELL AND MOTOR MECHANISM
Filed March 5, 1958  3 Sheets-Sheet 1

INVENTOR.
BY JOSEPH L. CASSELL
ATTORNEY

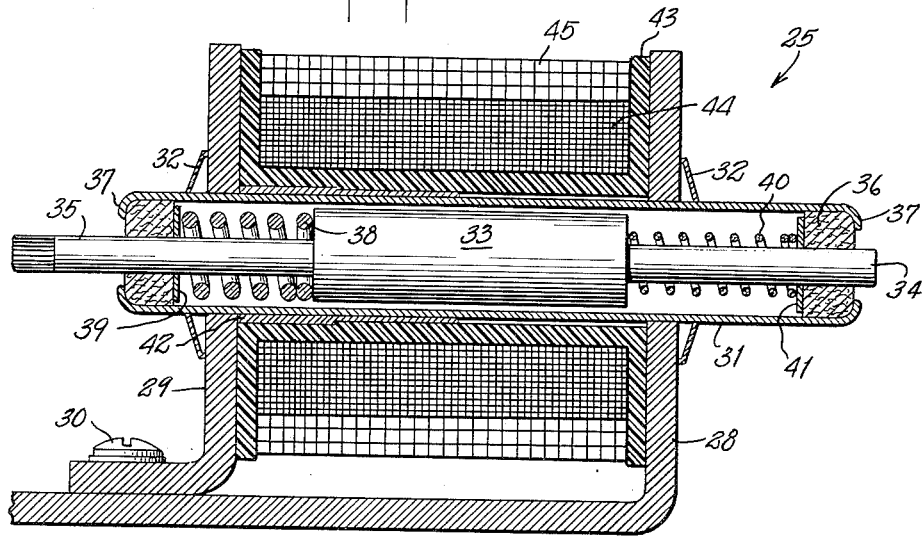

March 27, 1962   J. L. CASSELL   3,027,554
CONTACTLESS DIRECT CURRENT VIBRATING BELL AND MOTOR MECHANISM
Filed March 5, 1958   3 Sheets-Sheet 3
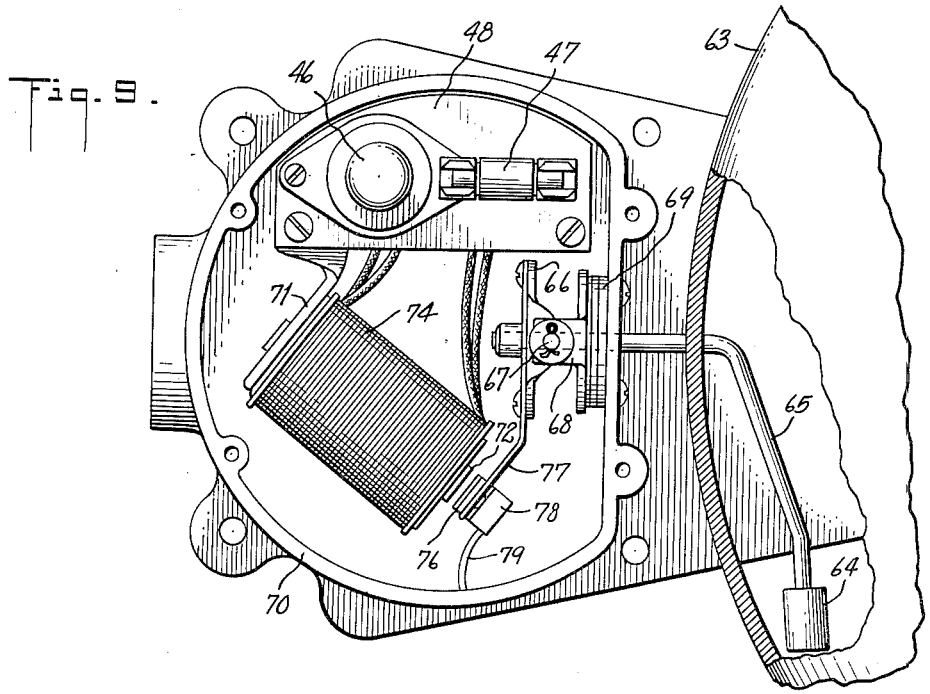
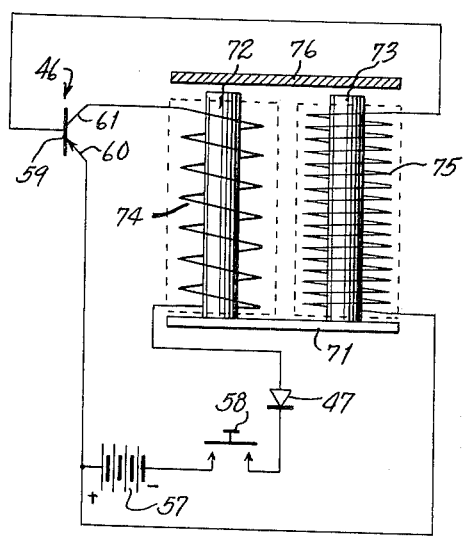
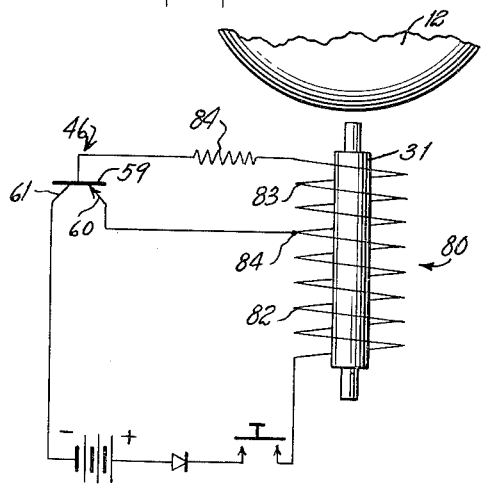
INVENTOR.
JOSEPH L. CASSELL
BY
Philip S. H. Bean
ATTORNEY United States Patent Office 3,027,554
Patented Mar. 27, 1962

3,027,554
CONTACTLESS DIRECT CURRENT VIBRATING
BELL AND MOTOR MECHANISM
Joseph L. Cassell, New York, N.Y., assignor to The Reeve Electrical Co. Inc., New York, N.Y., a corporation of New York
Filed Mar. 5, 1958, Ser. No. 719,286
16 Claims. (Cl. 340—392)

The present invention relates to electromechanical vibrating bells and more particularly to contactless vibrating bells and motor mechanisms adapted to be energized from a low voltage direct current source.

The vibrating bell of the present invention is characterized by its freedom from the usual self-interrupting contacts which become worn, pitted and coated with oxide films or other high resistance impurities. Where such a bell of the usual conventional construction is energized from a direct current source of moderately high voltage, such as 100 volts or more, the voltage of the energizing circuit is ordinarily sufficient to break down any oxide film which may have been formed on the self-interrupting contacts. In alarm systems, however, where the bell is energized from a low voltage direct current source, such as a 12 volt storage battery, the presence of slight oxide films, dust or the like on the self-interrupting contacts will render the bell completely inoperative.

In accordance with the invention, the bell is provided with an energizing winding, a feedback winding, and a transistor connected in the energizing circuit; the transistor having a control electrode connected to the feedback winding. The transistor is connected to the feedback and energizing windings so that the electromagnetic percussion structure which strikes the bell shell is self-oscillatory at a frequency determined substantially solely by the mechanical resonance frequency of the percussion system. The transistor, being hermetically sealed, is not subject to oxidation effects or other deterioration.

In accordance with another feature of the invention, means are provided for heat dissipation so that the transistor does not attain a high temperature during continued operation of the bell, such that the useful life of the transistor would be appreciably shortened.

Still another feature of the invention provides for the suppression of voltages of reversed polarity which might damage the transistor.

Various objects, additional features and advantages of the invention will become apparent upon reading the following specification together with the accompanying drawings forming a part hereof.

Referring to the drawings:

FIG. 4 is an enlarged view in axial section showing the solenoid mechanism of the bell of FIGS. 1 and 2, the view being taken along the line 4—4 of FIG. 3.

FIG. 5 is an enlarged view in end elevation, partly in section, showing details of a heat dissipating mounting for the transistor and rectifier which are included in the bell shown in FIGS. 1, 2 and 3, the view being taken along the line 5—5 of FIG. 3.

FIG. 6 is a side elevational view, partly in section, of the transistor and rectifier mounting shown in FIG. 5, the view being taken along the line 6—6 of FIG. 3.

FIG. 7 is an electrical circuit diagram showing the bell of FIGS. 1 through 6 connected in a controllable energizing circuit.

FIG. 8 is a view on a reduced scale, similar to FIG. 3, showing the vibratory solenoid mechanism arranged as a buzzer in a housing which is struck percussively to act as a sound emitting member.

FIG. 9 is a fragmentary elevational view of a modified form of bell using a clapper armature type of electromagnet instead of a solenoid.

FIG. 10 is an electrical circuit diagram showing the bell of FIG. 9 connected for operation.

FIG. 11 is a circuit diagram showing a modified form of solenoid operated bell connected for operation.

Figure 1:
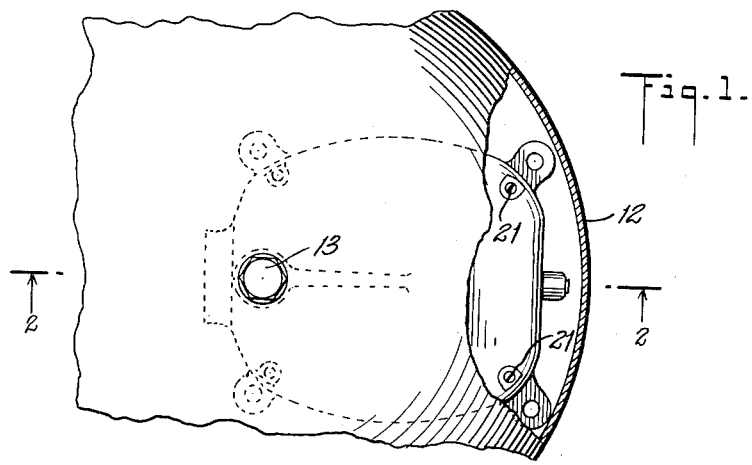
FIG. 1 is a fragmentary front elevational view of a vibrating bell in accordance with the invention, partially broken away to illustrate details of construction.
Figure 2:
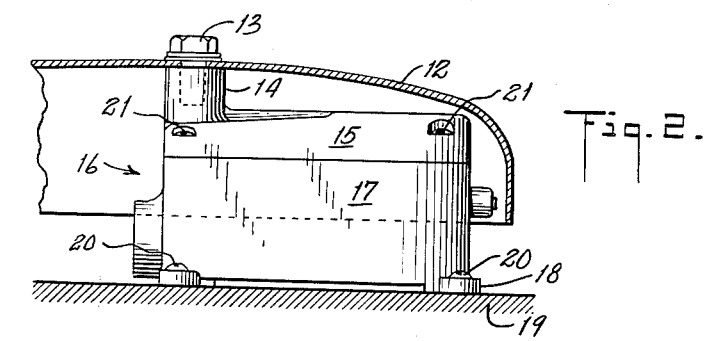
FIG. 2 is a fragmentary bottom view of the bell shown in FIG. 1, the bell top or bell shell being shown in section along the line 2—2 of FIG. 1.

Referring to FIG. 1, a vibrating bell is illustrated which comprises a bell shell or bell top 12 of pressed steel, bronze or the like secured by a cap screw 13 to a boss 14 formed on a removable cover portion 15 of a mechanism housing designated generally as 16. The main portion 17 of the mechanism housing 16 is shown provided with four mounting feet 18 for securing the bell to a wall or other suporting structure 19 as by screws 20 (FIG. 2).

Figure 3:
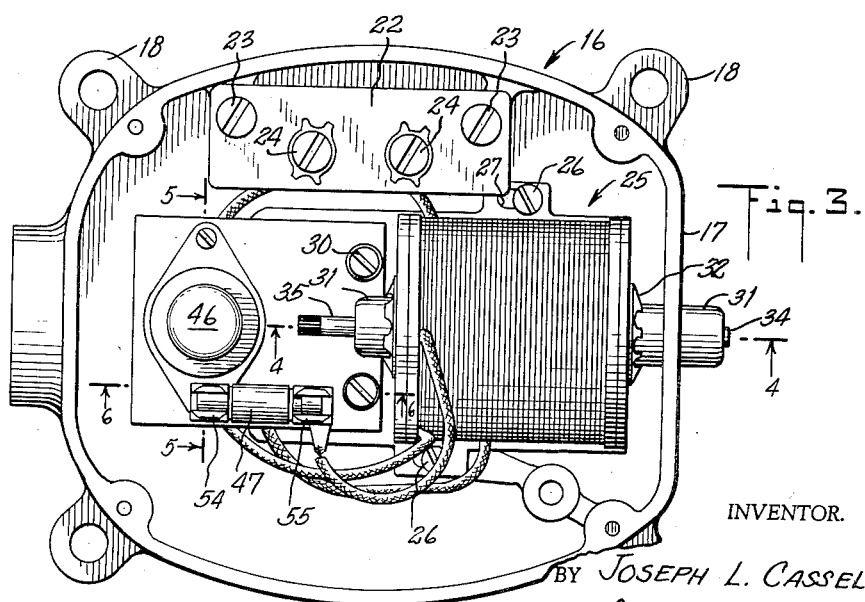
FIG. 3 is an enlarged front view of the operating mechanism of the bell of FIG. 1, the cover being removed to show the internal arrangement of the circuit elements.

The cover portion 15 of the mechanism housing 16 is removably secured to the main portion 17 by screws 21. Disposed within the housing 16 (FIG. 3) is a terminal block 22 formed of insulating material. The terminal block 22 is secured within the main housing portion 17 by mounting screws 23. Energizing terminals 24 are mounted on the terminal block 22 and are connected as described in greater detail below with reference to FIG. 7.

Secured to the interior of the base portion 17 of housing 16 there is a vibratory solenoid type electromagnet designated generally as 25. The position of the solenoid 25 is adjustable by loosening mounting screws 26 disposed in elongated slots 27 and threaded into the housing base 17. The solenoid 25 (FIG. 4) comprises an L-shaped magnetic base member 28. Magnetic bracket 29 is secured to the base member 28 by screws 30. A tube 31 formed of non-magnetic material extends through aligned holes in the base member 28 and bracket 29. The tube 31 is secured against longitudinal movement by internally toothed washers 32 formed of spring steel, the teeth of which dig in to the outer surface of the tube 31. Disposed within the tube 31 is a solenoid plunger 33. The plunger 33 is supported between coaxially aligned guide rods 34 and 35 which extend through lubricated felt guide washers 36. The ends of the tube 31 are rolled over as indicated at 37 to retain the guide washers 36 within the ends of the tube 31. The free end of guide rod 34 serves as a hammer for striking the bell 12.

Disposed within the tube 31 and surrounding the guide rod 35 there is a relatively stiff helical compression spring 38 which acts as a buffer. One end of the spring 38 bears against a flat washer 39 and the other end bears against the end of the plunger 33. The flat washer 39 presses against one of the felt guide washers 36. The guide rod 34, within the tube 31, is surrounded by a relatively weak helical compression spring 40. One end of the spring 40 bears against the other end of the plunger 33. The other end of spring 40 bears against a flat washer 41 which is pressed against the felt guide washer 36 at the right hand end of the tube 31.

A close-fitting magnetic tube 42 surrounds the non-magnetic plunger tube 31 and extends from the magnetic bracket 29 about half way to the L-shaped magnetic base member 28, leaving a non-magnetic gap to be bridged by the solenoid plunger 33.

A winding spool 43, formed of insulating material, is mounted on the magnetic tube 42 and extends between the pole pieces formed by the upright portions of the L- shaped magnetic base member 28 and the magnetic bracket 29. An inner feedback winding 44, consisting of relatively fine insulated copper magnet wire is wound on the spool 43. Also wound on the spool 43, exteriorly of the feedback winding 44, there is an operating winding 45 composed of relatively coarse magnet wire. The two windings 44 and 45 are thus electromagnetically linked to the magnetic circuits 33—28—29—42.

As shown in FIGS. 5 and 6, a transistor 46 and a silicon rectifier 47 are mounted on a thermally conductive aluminum mounting plate 48. A sheet of mica 49 overlies the mounting plate 48 thereby providing electrical insulation for the apparatus on the mounting plate 48 without impairing the heat dissipating effect of the aluminum. The mounting plate 48 is fastened to the L-shaped magnetic base member 28 by screws 30 which extend through spacers 50. The transistor is fastened to the mounting plate 48 by screws 51 and 52 provided with nuts 53. Circuit connections are provided by suitable lead wires which are described in greater detail below. The rectifier 47 is of the cartridge type and is mounted in spring clips 54 and 55. The mounting screw 52 for the transistor 46 also secures the spring clip 54 in position. The other spring clip 55 is secured by a separate insulated mounting screw 56 to the plate 48.

Referring to FIG. 7, a source of direct current diagrammatically indicated as a battery 57 has its positive terminal connected directly to one of the bell terminals 24. The negative terminal of battery 57 is connected through a push button 58 or other bell control contacts to the other bell terminal 24.

The transistor 46 is illustratively shown as being of the PNP type. The transistor 46 comprises a base or control electrode 59, an emitter 60 and a collector or anode 61. The main energizing circuit for the bell extends from the positive terminal 24, through the emitter 60 to the collector 61 and thence through the main solenoid operating winding 45 and rectifier 47 to the negative bell terminal 24. The feedback winding 44 is connected between the positive bell terminal 24 and the base electrode 59 of transistor 46. It is contemplated that the resistance of feedback winding 44 will be sufficiently high to avoid the need for a separate biasing resistor. The rectifier 47 prevents the inadvertent application of reversed potentials to the transistor if the bell energizing circuit should be connected with reversed polarity to bell terminals 24. Such potentials of reversed polarity could damage the transistor 46.

In operation, the potentital induced in the feedback winding 44 by current flow in the operating winding 45 is applied to the base electrode 59 and reduces flow from emitter 60 to collector 61 and through the bell operating winding 45. When the current flow in the operating winding 45 is reduced, the induced potential applied to the base electrode 59 is reversed and current flow through the operating winding 45 is increased. However, increased current flow through the operating winding 45 urges the solenoid plunger 33 toward the right as shown in FIG. 4 so that it moves against the yielding action of compression spring 40 into a position where the reluctance of the magnetic circuit is reduced and the coefficient of coupling between the windings 44 and 45 is increased. This action still further increases the control voltage applied to the base electrode 59 of transistor 46. The current flow in the operating winding 45 is then reduced to a low value such that the plunger 33 is returned toward the left by the weak compression spring 40 to engage the stiff buffer spring 38. In so doing, a reversed potential is induced in the feedback winding 44 which is applied to the base electrode 59 of transistor 46.

Thus there is a transformer action between the operating winding 45 and the feedback winding 44 which tends to provide a current flow through the operating winding 45 which is of a sustained oscillatory nature. This transformer action is influenced, however, by the axial displacement of the solenoid plunger 33 and is at a maximum when the solenoid plunger 33 is in its minimum reluctance position. The windings 44 and 45 are so poled that the plunger 33 is thus caused to reciprocate longitudinally within the tube 31 at a frequency determined by the natural period of mechanical oscillation of the system consisting of the springs 38 and 40, the plunger 33 with its guide rods 34 and 35 and the effect of percussion of the tip of guide rod 34 against the bell 12. No tuned electrical circuit elements are required for accurate frequency determination, the electrically oscillatory portion of the circuit being effectively aperiodic. The plunger reciprocates at its own constant frequency natural period and hence with a maximum efficiency of conversion of direct current electrical energy into reciprocatory mechanical energy.

Referring to FIG. 8, a modified arrangement is illustrated wherein the tip of the guide rod 34 strikes the wall of the housing base portion 17, so that the device operates as a buzzer. The mounting plate 48 has been moved to one side of the solenoid mechanism 25 opposite the terminal block 22, being secured to the base portion 17 of housing 16 by screws 62.

FIGS. 9 and 10 illustrate a modified form of the invention wherein the solenoid 25 has been replaced by an electromagnet having a clapper type armature. A bell shell or bell top 63 is arranged to be struck by a hammer 64 mounted at the free end of a bent rod 65. The other end of rod 65 is secured in a pivotally mounted yoke 66. The yoke 66 is mounted by a pivot pin 67 in a two-eared mounting bracket 68. The bracket 68 forms a part of a watertight sealing unit designated generally as 69 through which the rod 65 passes from the interior to the exterior of a housing base member 70. The cooperating cover member for base member 70 is not shown.

The electromagnet comprises a fixed bracket 71 of magnetic material mounted within the housing base member 70. Magnet cores 72 and 73 are fixed to the bracket 71. The cores 72 and 73 are provided with magnet windings 74 and 75, respectively. Winding 74 is the operating winding and winding 75 is the feedback winding. A clapper type armature 76 is fixed to the free end of an arm 77 carried by the yoke 66. A back stop 78 for armature 76 is mounted on a support 79. The position of back stop 78 may be adjusted by bending the support 79. Spring means (not shown) are provided for yieldingly urging the armature 76 away from the free ends of the magnet cores 72 and 73.

The minimum reluctance position of the armature 76 is its position of closest approach to the magnet cores 72 and 73. In this position there is a maximum coupling between the operating winding 74 and the feedback winding 75. The operating winding 74 and the feedback winding 75 are connected in the same manner as the corresponding windings 45 and 44, respectively, shown in FIG. 7, and the operation of the bell is similar to that described above in connection with FIG. 7. In FIG. 10, however, the armature 76 moves laterally in a vibratory oscillatory manner toward and away from the ends of the cores 72 and 73 instead of reciprocating longitudinally like the solenoid plunger 33.

FIG. 11 shows a modified form of solenoid construction in which a single solenoid winding 80 is used. The solenoid winding 80 is provided with a tap point 81 which divides it into two inductively coupled portions 82 and 83. The main portion 82 is common to the circuits of the collector electrode 61 and base electrode 59 of the transistor 46. The feedback portion 83 serves as a voltage boosting auto-transformer winding which is connected separately to the base electrode 59. Because it is not contemplated that the resistance of the winding 80 is sufficiently high, a biasing resistor 84 is shown connected in series with the base electrode 59 to increase the resistance of the base electrode circuit. The operation of FIG. 11 is otherwise the same as that described above in connection with FIG. 7.

While I have described some of what I believe to be the best embodiments of my invention, it will be apparent that various changes and modifications may be made therein without departing from the spirit and scope of the invention as defined in the appended claims.

The elimination of contacts and use of a transistor in the bell motor organization provides for a particularly compact, small size unit, consisting of but few sturdy parts enclosed and protected against dust, moisture, insects and the like. In the buzzer construction shown in FIG. 8, all parts are protected within a completely closed housing, with the latter serving as the resonant member. The clapper type bell motor shown in FIG. 9 also is completely enclosed in the housing. These housings can be quite small and shaped to meet special requirements since the parts to be enclosed, other than the magnet windings, are just the small size transistor and rectifier.

The solenoid structure in itself is moisture-proof and dust-proof because the core and its balancing springs is completely enclosed within a non-magnetic guide tube, sealed at opposite ends by the felt guide washers, which as shown in FIG. 4, serve as silent self-lubricated bearings for the core. These parts are held assembled by the inturned ends of the guide tube and this unit, the guide tube with enclosed parts, is secured in proper position in the magnet winding by just locating it in the winding and setting the lock washers 32, at the ends of the winding to secure the guide tube in that relation. The enclosed core elements may thus be made up as separate units and later assembled in the magnets with jigs or the like, to assure locating and securing them in proper relation in the windings. The solenoid core 33, is of magnetic material and the guide rod 35, may be of magnetic material and an integral extension of the same. The striking portion 34, may be of bronze or other non-magnetic material. The back spring 38, abutment washer 39, front spring 40 and abutment washer 41, may all be of non-magnetic material.

With this construction, it is possible to regulate or tune the action by adjusting the core unit in the winding to the point where the oscilloscope test will show a maximum forward pulse providing constant powerful ringing effect. After ascertaining the proper position for the desired maximum ringing effects, the core units may then be secured by the lock washers in this particular position in the magnets.

What is claimed is:

1. A vibratory electromechanical device comprising, in combination, a magnetic circuit including a movable vibratory magnetic member, means mechanically tuning said vibratory member to resonance at a predetermined frequency, an operating winding for causing movement of said vibratory member disposed to magnetize said magnetic circuit, a feedback winding electromagnetically linked to said magnetic circuit, and an aperiodic amplifying circuit adapted for energization from a direct current source, said amplifying circuit having an output connected to said operating winding to energize the same and an input connected to said feedback winding, voltages induced in said feedback winding by vibratory movement of said vibratory member being amplified by said amplifying circuit and applied to said operating winding with a polarity to cause sustained vibratory movement of said vibratory member at said predetermined frequency.

2. A vibratory electromechanical device, comprising in combination, a direct current energizing circuit, a transistor including base, emitter and collector electrodes and having its emitter-collector circuit connected to said energizing circuit, an operating winding serially included in said emitter-collector circuit, a feedback winding coupled to said operating winding, said feedback winding being connected to said base electrode and said energizing circuit, a mechanically vibratory magnetizable output member disposed in the magnetic field of said operating winding, both of said windings being electromagnetically linked to said magnetizable output member, and means mechanically resonating said output member to vibrate at a predetermined frequency, said emitter-collector and base electrode circuits being substantially aperiodic, said energizing circuit and said transistor electrode circuits being effectively aperiodic, said windings being poled to cause sustained vibration of said output member at said predetermined frequency.

3. A device according to claim 2, further comprising sound emitting means percussively engageable by said output member.

4. A device according to claim 2, further comprising rectifier means included in said energizing circuit, said rectifier means being connected to prevent reverse current flow through said transistor.

5. A vibratory electromechanical device comprising, in combination, a magnetic circuit including a mechanically vibratory magnetizable member which varies the reluctance of said magnetic circuit throughout each vibration thereof, an operating winding electromagnetically linked to said magnetic circuit, a feedback winding electromagnetically linked to said magnetic circuit, a direct current energizing circuit, a transistor having base, emitter and collector electrodes, said operating winding being connected to said energizing circuit through the emitter-collector circuit of said transistor, circuit means connecting said base electrode to said energizing circuit through said feedback winding to produce sustained oscillatory current flow through said operating winding, and means mechanically tuning said vibratory member to resonance at a predetermined frequency, said emitter-collector circuit and said circuit means being effectively aperiodic, said windings being poled to cause said vibratory member to vibrate at said predetermined frequency during energization of said energizing circuit.

6. A device according to claim 4, further comprising sound emitting means actuated by said vibratory member.

7. A vibratory electromechanical device, comprising a magnetic circuit including a longitudinally reciprocable solenoid plunger, spring means acting on said plunger and tuning the same for longitudinal reciprocation at a predetermined frequency, an operating winding electromagnetically linked to said magnetic circuit for displacing said plunger, feedback means responsive to variations in the magnetic flux in said circuit, and aperiodic amplifying means having an output connected to said operating winding and an input connected to said feedback means, said windings being poled to cause said plunger to reciprocate at said predetermined frequency.

8. A vibratory electromechanical device comprising a magnetic circuit including a longitudinally reciprocable solenoid plunger, an operating winding disposed to magnetize said magnetic circuit, a feedback winding electromagnetically coupled to said magnetic circuit, a transistor having base, emitter and collector electrodes, a direct current energizing circuit, said operating winding being connected to said energizing circuit through the emitter-collector circuit of said transistor, circuit means including said feedback winding connecting said base electrode to said energizing circuit to cause sustained oscillatory current flow through said operating winding, and spring means tuning said plunger for reciprocation at a predetermined frequency, said emitter-collector and base electrode circuits being effectively aperiodic whereby said plunger reciprocates at said predetermined frequency.

9. A device according to claim 8 wherein said operating winding and feedback winding are formed by different portions of a tapped single winding.

10. A vibratory electromechanical device, comprising a magnetic circuit having two electromagnets and a clapper type armature jointly influenced by said two magnets, said magnets and said armature forming a magnetic circuit the reluctance of which varies with the position of said armature, means mechanically tuning said armature for vibratory movement at a predetermined frequency, an operating winding included in one of said electromagnets, a feedback winding included in the other electromagnet, and aperiodic amplifying menas having an input connected to said feedback winding and an output connected to said operating winding, said windings being poled to cause vibratory movement of said armature at said predetermined frequency.

11. A vibratory electromechanical device comprising a magnetic circuit including a longitudinally reciprocable solenoid plunger, an operating winding disposed to magnetize said magnetic circuit, a feedback winding electromagnetically coupled to said magnet circuit, a transistor having base, emitter and collector electrodes, a unidirectionally conductive direct current energizing circuit, said operating winding being connected to said energizing circuit through the emitter-collector circuit of said transistor, circuit means including said feedback winding connecting said base electrode to said energizing circuit to cause sustained oscillatory current flow through said operating winding, and spring means tuning said plunger for reciprocation at a predetermined frequency, said emitter-collector and base electrode circuits being effectively aperiodic whereby said plunger reciprocates at said predetermined frequency.

12. A device according to claim 11 wherein said operating winding and feedback winding are formed by different portions of a tapped single winding.

13. A vibratory electromechanical motor, comprising a solenoid winding, a non-magnetic guide tube extending through said winding, a magnetic solenoid core in said guide tube provided with rod extensions of lesser diameter at opposite ends, opposed helical springs surrounding said rod extensions, abutment washers at the outer ends of said springs, bearing washers of felt-like material for said rod extensions at the outer sides of said abutment washers, the ends of said guide tube being closed in over said bearing washers and securing said parts in assembled relation and lock washers engaging said guide tube at the opposite ends of said solenoid winding and securing said guide tube assembly in longitudinally fixed relation to said solenoid winding.

14. A device according to claim 5, in which said feedback winding simultaneously serves as a biasing resistor in said magnet circuit.

15. A vibratory electromechanical motor comprising an electromagnet, an energizing circuit for said electromagnet, a transistor included in said energzing circuit for causing said electromagnet to operate in a vibratory manner, a thermally conductive plate of electrically insulative material upon which said transistor is thermally conductively mounted, and a metallic plate of thermally conductive material secured to said first-named plate, said first-named plate and said last-named plate being disposed in thermally conductive relationship with respect to each other, whereby heat generated in said transistor during said opeartion of said electromagnet will be transmitted from said transistor to said last-named plate for dissipation thereby.

16. A motor according to claim 15 wherein said electrically insulative material is mica.

References Cited in the file of this patent

UNITED STATES PATENTS

| | | |
|---|---|---|
| 462,381 | Hale | Nov. 3, 1891 |
| 1,839,342 | Richmond | Jan. 5, 1932 |
| 2,126,433 | Von Voigtlander | Aug. 9, 1938 |
| 2,152,300 | Bossard | Mar. 28, 1939 |
| 2,304,095 | Hull | Dec. 8, 1942 |
| 2,325,081 | Stern | July 27, 1943 |
| 2,573,076 | Welch | Oct. 30, 1951 |
| 2,759,179 | Kircher | Aug. 14, 1956 |
| 2,820,913 | Christy | Jan. 21, 1958 |
| 2,908,829 | Schaeve | Oct. 13, 1959 |
| 2,910,689 | Grace | Oct. 27, 1959 |

OTHER REFERENCES

Publication, "Radio and T.V. News," July 1957, pages 94 and 95.